United States Patent
Ignatenko et al.

(10) Patent No.: US 11,792,588 B2
(45) Date of Patent: Oct. 17, 2023

(54) FITTING AGENT FOR A HEARING DEVICE AND METHOD FOR UPDATING A USER MODEL

(71) Applicant: GN Hearing A/S, Ballerup (DK)

(72) Inventors: Tanya Ignatenko, Ballerup (DK); Kirill Kondrashov, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 17/679,013

(22) Filed: Feb. 23, 2022

(65) Prior Publication Data

US 2022/0303701 A1  Sep. 22, 2022

(30) Foreign Application Priority Data

Mar. 17, 2021 (DK) .............. PA 2021 70122

(51) Int. Cl.
*H04R 25/00* (2006.01)
(52) U.S. Cl.
CPC ............. *H04R 25/70* (2013.01); *H04R 25/30* (2013.01); *H04R 25/505* (2013.01)
(58) Field of Classification Search
CPC ....... H04R 25/70; H04R 25/505; H40R 25/30
USPC ......................................................... 381/60
See application file for complete search history.

(56) References Cited

U.S. PATENT DOCUMENTS

| | | |
|---|---|---|
| 2010/0008526 A1 | 1/2010 | De Vries et al. |
| 2016/0112795 A1* | 4/2016 | Bach ............... H03M 3/464 341/143 |
| 2019/0253814 A1 | 8/2019 | De Vries et al. |
| 2020/0145765 A1 | 5/2020 | De Vries et al. |
| 2020/0391037 A1 | 12/2020 | Grado et al. |

FOREIGN PATENT DOCUMENTS

| | | |
|---|---|---|
| EP | 3493555 | 6/2019 |
| WO | WO 2016/004983 | 1/2016 |
| WO | WO 2019/195866 | 10/2019 |
| WO | WO 2020/144160 | 7/2020 |

OTHER PUBLICATIONS

1st technical examination report for Danish patent application No. PA 2021 70122 dated Jun. 2, 2021.

(Continued)

*Primary Examiner* — Sean H Nguyen
(74) *Attorney, Agent, or Firm* — Vista IP Law Group, LLP (57) ABSTRACT

A fitting agent, e.g. for update of a user model for a hearing device user, and related method is disclosed, wherein the fitting agent is configured to initialize a user model comprising a user preference function and/or a user response distribution; obtain a primary test setting for the hearing device; obtain a secondary test setting for the hearing device; present the primary test setting and the secondary test setting to a user; detect a user input of a preferred test setting indicative of a preference for either the primary test setting or the secondary test setting; and update the user model based on hearing device parameters of the preferred test setting, wherein to update the user model optionally comprises to determine a posterior of parameters of the user preference function, e.g. based on a previous parameter posterior, the preferred test setting, and a non-preferred test setting.

16 Claims, 4 Drawing Sheets

(56) References Cited

OTHER PUBLICATIONS

Extended European Search Report for EP Patent Appln. No. EP 21163902.6 dated Sep. 28, 2021.
Cox, M., et al., "A parametric approach to Bayesian optimization with pairwise comparisons," 31st Conference on Neural Information Processing Systems (NIPS 2017).
Ignatenko, T., et al., "On sequential Bayesian optimization with pairwise comparison," Cornell University, dated Mar. 24, 2021.
3rd technical examination report for Danish patent application No. PA 2021 70122 dated Feb. 7, 2020.
Jensen, N., et al., "Perceptual effects of adjusting hearing-aid gain by means of a machine-learning approach based on individual user preference," Trends In Hearing, vol. 23, dated 2019.

* cited by examiner

FITTING AGENT FOR A HEARING DEVICE AND METHOD FOR UPDATING A USER MODEL

RELATED APPLICATION DATA

This application claims priority to, and the benefit of, Danish Patent Application No. PA 2021 70122 filed on Mar. 17, 2021. The entire disclosure of the above application is expressly incorporated by reference herein.

FIELD

The present disclosure relates to hearing devices and related tools, methods, and systems in particular for one or more of determining, tuning, fitting and optimizing hearing device parameters. Thus, a fitting agent for a hearing device and related methods, in particular a method for updating a user model, are provided.

BACKGROUND

Fitting and tuning of hearing devices or hearing aids has always been considered a tedious task of healthcare professionals (HCPs). Traditional approaches for fitting hearing device parameters rely on compensation of a user's hearing loss, based on audiograms, by applying rules such as NAL-NL1 or NAL-NL2. These rules, however, do not take into account specific user preferences.

Recent approaches involve preference learning for hearing devices.

EP 3 493 555 A1 relates to a method for tuning hearing device parameters of a hearing device and hearing device. The method comprises initializing a model; obtaining an initial test setting defined by one or more initial test hearing device parameters; assigning the initial test setting as a primary test setting; obtaining a secondary test setting based on the model; outputting a primary test signal according to the primary test setting; outputting a secondary test signal according to the secondary test setting; detecting a user input of a preferred test setting; updating the model based on the primary test setting, the secondary test setting, and the preferred test setting; and in accordance with a determination that a tuning criterion is satisfied, updating the hearing device parameters of the hearing device based on hearing device parameters of the preferred test setting.

SUMMARY

Challenges still remain in improving the tools, methods and devices allowing an improved fitting and tuning of hearing device parameters.

A fitting agent, e.g. for update of a user model for a hearing device user, is disclosed, wherein the fitting agent is configured to initialize a user model comprising a user preference function and/or a user response distribution; obtain a primary test setting for the hearing device; obtain a secondary test setting for the hearing device; present the primary test setting and the secondary test setting to a user; detect a user input of a preferred test setting indicative of a preference for either the primary test setting or the secondary test setting; and update the user model based on hearing device parameters of the preferred test setting, wherein update the user model optionally comprises to determine a posterior of parameters of the user preference function (also denoted parameter posterior), e.g. based on a previous parameter posterior, the preferred test setting, and a non-preferred test setting.

Also disclosed is a method of updating a user model for a hearing device user, wherein the method comprises initializing a user model comprising a user preference function and/or a user response distribution; obtaining a primary test setting for the hearing device; obtaining a secondary test setting for the hearing device; present the primary test setting and the secondary test setting to a user; detecting a user input of a preferred test setting indicative of a preference for either the primary test setting or the secondary test setting; and updating the user model based on hearing device parameters of the preferred test setting. In the method, updating the user model optionally comprises determining a posterior of parameters of the user preference function (also denoted parameter posterior) based on a previous parameter posterior, the preferred test setting, and a non-preferred test setting.

It is an advantage of the present disclosure that an effective and memory-efficient user preference model update is provided. In particular, the need for storing historical and specific user feedback (previous primary and secondary test settings and preference thereof) is eliminated in turn reducing the memory requirements.

It is an advantage of the present disclosure that a simple and effective way to configure one or more hearing device parameters of a hearing device are provided. Further, the present disclosure provides an improved listening experience to the user by improving the modelling of the users preferred hearing parameter settings in turn resulting in optimized settings being applied in the hearing device.

Advantageously, the present disclosure makes use of the information provided in user responses in order to steer the learning process. The present disclosure provides a metric that can be efficiently used to evaluate the learning performance in the absence of true user preference information, which in turn allows for optimized user feedback and model optimization.

The present disclosure provides an efficient automated search for optimal hearing device parameters by incorporating a user feedback into the learning cycle. A fitting agent, devices, and methods are provided, that allows to learn user preferences for hearing device parameters in an efficient and minimally obtrusive way by empowering the user to take direct decisions and have direct impact on the fitting and/or tuning process.

Further, the present disclosure allows that hearing device parameters can be configured, such as fitted and/or tuned, during a normal operating situation and/or with a small number of user inputs/interactions. Thus, a simple and smooth user experience of the hearing device is provided.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A fitting agent is disclosed. The fitting agent or at least a first part thereof may be implemented, e.g. as an application, in an accessory device, such as an electronic device. The accessory device comprises an interface, a processor, and a memory. The accessory device may for example be or comprise a mobile phone, such as a smartphone, a smartwatch, a special purpose device, a computer, such as a laptop computer or PC, or a tablet computer. The fitting agent or at least a second part thereof may be implemented in a server device. The fitting agent or at least a third part thereof may be implemented in a hearing device.

The present disclosure relates to hearing systems, fitting agent, accessory device and hearing device of hearing system, and related methods. The accessory device forms an accessory device to the hearing device. The accessory device is typically paired or wirelessly coupled to the hearing device. The hearing device may be a hearing aid, e.g. of the behind-the-ear (BTE) type, in-the-ear (ITE) type, in-the-canal (ITC) type, receiver-in-canal (RIC) type or receiver-in-the-ear (RITE) type. The hearing device may be a hearable, such as a pair of earbuds or a headset. Typically, the hearing device system is in possession of and controlled by the hearing device user.

The hearing system may comprise a server device and/or a fitting device. The fitting device is controlled by a dispenser and is configured to determine configuration data, such as fitting parameters. The server device may be controlled by the hearing device manufacturer.

The fitting agent is configured to receive and detect a user input of a preferred test setting indicative of a preference for either the primary test setting or the secondary test setting. The non-preferred test setting is the primary test setting or the secondary test setting not being selected as a preferred test setting. Accordingly, a hearing device and/or accessory device(s) implementing the fitting agent or at least a part of the fitting agent may comprise one or more user interfaces for receiving and/or detecting a user input. For example, the hearing device may comprise a user interface receiving a user input. The user interface of the hearing device may comprise one or more buttons, an accelerometer and/or a voice control unit. The accessory device may comprise a user interface. The user interface of the accessory device may comprise a touch sensitive surface, e.g. a touch display, and/or one or more buttons. The user interface of the accessory device may comprise a voice control unit. The user interface of the hearing device may comprise one or more physical sliders, knobs and/or push buttons. The user interface of the accessory device may comprise one or more physical or virtual (on-screen) sliders, knobs and/or push buttons.

The method or at least parts thereof may be performed in one or more electronic devices, such as a hearing device. The method or at least parts thereof may be performed in an accessory device or a plurality of accessory devices, such as in a smartphone optionally in combination with a smartwatch. The method may be a computer-implemented method. The fitting agent/method may be for/part of one or more of optimizing, determining, fitting, tuning, and modelling, such as determining hearing device parameters of a hearing device. Performing part(s) of the method in accessory device(s), such as a smartphone optionally in combination with a smart watch, may be advantageous in providing a more smooth user input and user experience. Further, performing part(s) of the method in accessory device(s) may be advantageous in providing a more power efficient method from the perspective of the hearing device. The method or at least parts thereof may be performed in a server device and/or in a fitting device.

The present disclosure relates to a fitting agent for a hearing device, and in particular to a fitting agent for one or more of optimizing, determining, fitting, and tuning hearing device parameters of a hearing device.

The fitting agent is configured to initialize a user model comprising a user preference function. The user model may comprise a user response model or function, e.g. comprising a user response distribution.

The user model optionally represents a probabilistic description of user responses, when comparing two sets of hearing device parameter settings. Integral parts of the model include a user preference function and a distribution of the user responses to the presented choices of parameters.

A vector of hearing device parameters defined on an M-dimensional continuous compact surface. In particular, hearing device parameters x are optionally defined on an M-dimensional hyper-cube, i.e., $x \in [0,1]^M$. In one or more exemplary fitting agents/method, the hearing device parameters may be normalized by their physical range. The fitting agent/method, is configured to find optimized/improved values of hearing device parameters, also denoted $\theta$ for a particular user. The number M of hearing device parameters may be 1 and/or less than 100, such as in the range from 10 to 50. The number M of hearing device parameters may be larger than 20, such as in the range from 25 to 75.

In general, the user preference function is unknown. The user preference function $f(x; \theta, \Lambda)$ may be a parametric function of hearing device parameters $x \in [0,1]^M$ with known form but unknown shape. This shape is optionally characterized by fitting or tuning parameters, $\theta \in [0,1]^M$ and a scaling matrix $\Lambda$. The scaling matrix $\Lambda$ may be a positive-definite scaling matrix $\Lambda$. The scaling matrix may be a diagonal matrix $\Lambda = \text{diag}([\lambda_1, \lambda_2, \ldots, \lambda_M]), \lambda_m \in \mathbb{R}^+$, $m=1, 2, \ldots, M$.

In one or more exemplary fitting agents/method, distribution priors may be applied to each element of $\Lambda$. For example, Lognormal distribution priors may be applied to each element of $\Lambda$, e.g., $\log(\lambda_m) \sim \mathcal{N}(\mu_m, \sigma_m^2)$ or Gamma distribution priors may be applied to each element of $\Lambda$, e.g., $\lambda_m \sim \text{Gamma}(\alpha_m, \beta_m)$.

The scaling matrix $\Lambda$ does not need to be a diagonal matrix. The scaling matrix $\Lambda$ may be selected as $\Lambda = L'^{*}L$, where L is a low-triangular matrix (also known as the Cholesky decomposition of $\Lambda$). Gaussian priors may be applied on each of the elements of L, e.g., $L_{ij} \sim \mathcal{N}(\mu_{ij}, \sigma_{ij}^2)$.

The user preference function may be denoted $f$ or $f(x; \theta, \Lambda)$. The user preference function $f(x; \theta, \Lambda)$ may be given by:

$$f(x; \theta, \Lambda) = -((x-\theta)^T \Lambda (x-\theta))^S, \tag{1}$$

where x is an M-dimensional vector optionally in the hypercube $[0,1]^M$ and that represents the (M) hearing device parameters of the device, $\theta$ is the maximizing argument of $f$, $\Lambda$ is a positive definite M×M scaling matrix characterizing user sensitivity to hearing device parameter changes, M is an integer, and s is a real-valued exponent. The real-valued exponent s may be in the range from 0.01 to 0.99. The real-valued exponent s may be less than 0.5 such as in the range from 0.01 to 0.45. The real-valued exponent s may be larger than 0.5 such as in the range from 0.55 to 0.99.

The maximizing argument $\theta$ may be a transformation of another variable, e.g. may be constrained by the following prior assumptions $$\theta = \Phi(\hat{Z}), \qquad (2)$$

where $\Phi(\hat{Z})$ is a cumulative density function of a probability distribution, such as the standard normal distribution, and $\hat{Z}$ is a sample from another probability distribution.

In one or more exemplary fitting agent/methods, the maximizing argument $\theta$ may be constrained by the following assumptions on representing $\theta$ as a transformation of $\hat{Z}$ and corresponding prior distribution of the transformed variable:

$$\theta = \Phi(\hat{Z}), \text{with} \hat{Z} \sim \mathcal{N}(\mu, \Sigma), \qquad (3)$$

where $\Phi(\hat{Z}) = \int_{-\infty}^{\hat{Z}} \mathcal{N}(x|0,1)dx$ is the cumulative density function of the standard normal distribution, and $\hat{Z}$ is a sample from the normal distribution with mean vector $\mu$ and covariance matrix $\Sigma$. Values of the mean and covariances may be learned from the user responses.

In one or more exemplary fitting agents/methods, the scaling matrix may be a transformed scaling matrix, e.g. by applying a log transform to the elements of the scaling matrix.

In one or more exemplary fitting agents/methods, the real-valued exponent s may be in the range from 0.25 to 0.75, such as 0.5.

Thus, the user preference function may be given as:

$$f(x;\theta,\Lambda) = -\sqrt{(x-\theta)^T \Lambda (x-\theta)}. \qquad (4)$$

The tuning parameters correspond to the location of the optimum of the function, $\theta$, which is the optimal hearing device parameters for a user; and to the spread around this optimum, $\Lambda$, that characterizes user sensitivity to hearing device parameter changes, respectively. The tuning parameters are user-specific and need to be learned in order to provide an optimum or improved user experience. The form of this user preference function has an attractive property that allows for quick narrowing of the search space.

The user model is optionally based on a first assumption and/or a second assumption. The first assumption may be that the user preference function is a unimodal preference function representative of preference of a user. The second assumption may be that the user can be uncertain about preference, which may be expressed in terms of an additive random variable. A value function u(•) may be defined in order to model user preference uncertainty. The value function u(•) may be defined as $$u(x) = f(x;\theta,\Lambda) + \varepsilon, \qquad (5)$$

where the user uncertainty error $\varepsilon$ is optionally assumed to have a Gaussian distribution, such as the standard Gaussian distribution, e.g.

$$\varepsilon \sim \mathcal{N}(0,1) \qquad (6)$$

The variance of the Gaussian distribution may be a real value, e.g. in the range from 0 to 1 or larger than 1.

A trial for a user defines a pair of test settings including a primary test setting and a secondary test setting. A user response is obtained to a user's pairwise comparison of test settings from a trial, defined by a pair {x_ref, x_alt} of test settings, where the primary test setting x_ref and the secondary test setting x_alt are the so-called reference and alternative parameter proposal, respectively. In other words, a trial T_n also denoted $D_l$ is performed, where each trial T_n comprises or is defined by primary test setting $x_n^{ref}$, secondary test setting $x_n^{alt}$ and preferred test setting $r_n$. The index n−1 refers to the previous trial T_n−1. Indexes 1 and n may be used interchangeably herein.

The fitting agent may be configured to present the primary test setting and the secondary test setting to a user. To present the primary test setting and the secondary test setting to a user may comprise transmitting the primary test setting and the secondary test setting from an accessory device to a hearing device. To present the primary test setting and the secondary test setting to a user may comprise to output a primary test signal according to the primary test setting and/or output a secondary test signal according to the secondary test setting. In other words, the fitting agent is optionally configured to output a primary test signal according to the primary test setting and to output a secondary test signal according to the secondary test setting. The fitting agent is configured to detect a user input of a preferred test setting indicative of a preference for either the primary test setting or the secondary test setting. The primary test setting x_ref is optionally initiated or obtained as the highest rated proposal/test setting from the previous trial and this situation is challenged by the secondary test setting x_alt in the given trial. The user response depends on the user's preferences for the presented test signals according to the respective test settings (hearing device parameters). The user's preference for a hearing device parameter or hearing device parameters is given or quantified by a value function. The user input or user response R may take or be assigned values from {0, 1}, where response "1" to a given trial {x_ref, x_alt} indicates that the secondary test setting or hearing parameters x_alt is preferred over or is as good as the primary test setting or hearing device parameters x_ref, and 0, otherwise, i.e., $$R \triangleq \begin{cases} 1, & \text{if } x\_alt \succcurlyeq x\_ref \\ 0, & \text{if } x\_ref \succ x\_alt \end{cases}, \qquad (7)$$

where $\succcurlyeq$ denotes preferred or equivalent to, and $\succ$ denotes strict preference.

The probability of a positive user response, i.e. that R takes value "1" in a trial {x_ref, x_alt}, is given by $$\begin{aligned}
Pr\{R = 1 \mid \{x^{ref}, x^{alt}\}, f\} & \qquad (8)\\
&= Pr\{u(x^{alt}) \geq u(x^{ref})\}\\
&= Pr\{f(x^{alt}; \theta, \Lambda) + \varepsilon' \geq f(x^{ref}; \theta, \Lambda) + \varepsilon\}\\
&= Pr\{\varepsilon - \varepsilon' \leq f(x^{alt}; \theta, \Lambda) - f(x^{ref}; \theta, \Lambda)\}\\
&= \Phi\left(\frac{f(x^{alt}; \theta, \Lambda) - f(x^{ref}; \theta, \Lambda)}{\sqrt{2}}\right)\\
&= \Phi(f(x^{alt}; \theta, \Lambda') - f(x^{ref}; \theta, \Lambda')),
\end{aligned}$$

where $\Phi(\bullet)$ is the cumulative distribution function (CDF) of the standard Gaussian distribution, and $$\Lambda' = \frac{\Lambda}{2}.$$

It is noted that x_ref and $x^{ref}$ are used interchangeably herein to denote primary test setting, and that x_alt and $x^{alt}$ are used interchangeably herein to denote secondary test setting.

Thus, R is a Bernoulli random variable with parameter $\Phi(f(x^{alt}; \theta, \Lambda') - f(x^{ref}; \theta, \Lambda'))$. Therefore, given the user preference function and user response model, defined by (1) and (4)-(8) above, the probability mass function (PMF) of a user response r to a trial {x_ref, x_alt} is given by:

$$P(r | \{x^{ref}, x^{alt}\}, f) = \Phi(f(x^{alt}; \theta, \Lambda') - f(x^{ref}; \theta, \Lambda'))^r \cdot \qquad(9)$$
$$(1 - \Phi(f(x^{alt}; \theta, \Lambda') - f(x^{ref}; \theta, \Lambda')))^{1-r}$$
$$= \Phi(f(x^{alt}; \theta, \Lambda') - f(x^{ref}; \theta, \Lambda'))^r \cdot$$
$$\Phi(f(x^{ref}; \theta, \Lambda') - f(x^{alt}; \theta, \Lambda'))^{1-r}.$$

This user response model, which relates binary observations to the continuous latent function (user preference function), is also known as the Thurstone-Mosteller law of comparative judgment. In statistics, it is called the binomial-probit regression model.

The fitting agent is configured to update the user model based on hearing device parameters of the preferred test setting and a non-preferred test setting. In particular, the fitting agent may be configured to update the user model based on (r, x_ref, x_alt). To update the user model may comprise to update the user preference function, or at least parameters thereof, based on one or more of the primary test setting, the secondary test setting and the user input of a preferred test setting. In other words, the parameters of the user preference function may be updated based on the result of the trial including the primary test setting, the secondary test setting and the preferred test setting of the primary test setting and the secondary test setting.

In one or more exemplary fitting agents and/or methods, to update the user model may be based on Bayesian inference. Updating the user model may comprise updating one or more of the parameters of the user preference function and/or user response model.

To update the user model may comprise to determine a posterior of the parameters of the user preference function, e.g., based on a previous parameter posterior, such as the last or current parameter posterior, preferred test setting, and a non-preferred test setting.

In some embodiments, a parameter posterior (or a posterior of parameter) relates to a likelihood of observed data (e.g., user response to a test) given the parameter(s) and parameter prior (i.e., previous parameter posterior). For example, a parameter posterior may be proportional to the likelihood of observed data given parameters multiplied with parameter prior, or may be any information indicating or representing the likelihood of the observed data and parameter prior.

In one or more exemplary fitting agents, to determine a posterior of parameters of the user preference function may comprise to determine or update a being the maximizing argument of $f$. In one or more exemplary fitting agents, to determine a posterior of parameters of the user preference function may comprise to determine or update A indicative of or characterizing user sensitivity to hearing device parameter changes.

In one or more exemplary fitting agents, to determine a posterior of parameters comprises to apply sequential estimation. In other words, to determine the parameter posterior may comprise to determine the parameter posterior based on only the previous posterior and the latest trial results. In other words, the posterior p_n may be based on the previous posterior p_n−1 and T_n.

In one or more exemplary fitting agents, to determine the parameter posterior comprises to determine a first posterior based on a parameter prior having a Gaussian distribution and a likelihood of the user response indicative of preferred test setting. In other words, the first posterior may be based on a parameter prior and the user response distribution.

The parameter prior may be an initial prior or the previous parameter posterior (p_n−1). The parameter prior may be given as:

$$q_{n-1}(\phi) = \mathcal{N}(\phi | \mu_{\phi, n-1}, \Sigma_{\phi, n-1}). \qquad(10)$$

The variable is a vector of parameters $\theta$ and $\log(\lambda_m)$, m=1, 2, ..., M. The first posterior may be an exact posterior. The parameter posterior may be based on the first posterior.

In one or more exemplary fitting agents, to determine the first posterior comprises to determine the likelihood of the user response by applying the user response distribution and update the parameter prior with likelihood of the user response and optionally perform a normalization for provision of the first posterior. The user response distribution is a probability distribution indicative of the likelihood of the observed user response for a user preferring the primary or secondary test setting as the preferred test setting.

In one or more exemplary fitting agents, to determine the parameter posterior comprises to determine a second posterior based on the first posterior and/or a minimization of a divergence, such as the KL-divergence, between the first posterior and a Gaussian distribution. The second posterior may be a Gaussian approximating family, however other approximating families may be applied.

In other words, to update the user model based on hearing device parameters of the preferred test setting may comprise to determine, after trial l, the exact posterior, e.g. given as $$\hat{p}(\phi | \mathcal{D}^l) = \frac{\hat{p}_l(\phi) q_{l-1}(\phi)}{\int \hat{p}_l(\phi) q_{l-1}(\phi) d\phi}, \qquad(11)$$

where $\hat{p}_l(\bullet)$ denotes a likelihood of a user response; and determine a distribution $q_l(\bullet)$ (second posterior) that minimizes the KL-divergence:

$$q_l(\phi): \min_{q(\cdot)} \mathrm{D}(\hat{p}(\phi | \mathcal{D}^l) \| q(\phi)) \qquad(12)$$

given that $q_l(\bullet)$ belongs to the family of Gaussian distributions.

In one or more exemplary fitting agents, to determine the parameter posterior comprises setting the second posterior as the posterior of the parameters of the user preference function.

In one or more exemplary fitting agents, to determine the second posterior comprises determining the first moment, and wherein the second posterior is based on the first moment. The first moment may be denoted $\mu_{\phi,l}$ and given as:

$$\mu_{\phi,l} = \mathbb{E}_{q_l(\phi)}[\phi] = \mathbb{E}_{\hat{p}(\phi | \mathcal{D}_l)}[\phi]. \qquad(13)$$

Thus the first moment of the second posterior coincides with the first moment of the first, exact, posterior. Here $\phi$ is a vector of optimizing parameters $\theta$ and transformed sensitivity parameters $\log(\lambda_m)$, m=1, 2, ...,M; and $\mathcal{D}^l$ indicates that $\hat{p}(\bullet)$ is the posterior obtained after l l iterations, based on l data points.

In one or more exemplary fitting agents, to determine the second posterior comprises determining the second moment, and wherein the second posterior is based on the second moment. The second moment may be denoted $\Sigma_{\phi,1}$ and given as:

$$\Sigma_{\phi,l} = \mathbb{E}_{q(\phi)}[(\phi - \mu_\phi)^T (\phi - \mu_\phi)] \qquad (14)$$
$$= \mathbb{E}_{\hat{p}(\phi|\mathcal{D}^l)}[(\phi - \mu_\phi)^T (\phi - \mu_\phi)].$$

Thus the second moment of the second posterior coincides with the second moment of the first, exact, posterior. Here, $\phi$ is a vector of optimizing parameters $\theta$ and transformed sensitivity parameters $\log(\lambda_m)$, m=1, 2, ..., M; and $\mathcal{D}^l$ indicates that $\hat{p}(\bullet)$ is the posterior obtained after/iterations, based on/data points.

In other words, solving (11) and (12) is equivalent to the maximum likelihood estimation problem for $\hat{p}(\phi|\mathcal{D}^l)$ and determining the second posterior reduces to determining the moments (13) and (14), and using them as parameters of the Gaussian distribution. Further, the first moment (13) may provide the hearing device parameters of the user preference function.

In one or more exemplary fitting agents, to determine the first moment comprises applying Monte-Carlo simulation optionally in combination with maximum likelihood estimation.

In one or more exemplary fitting agents, to determine the second moment comprises applying Monte-Carlo simulation optionally in combination with maximum likelihood estimation. Using Monte Carlo simulations to determine first moment and/or second moment simplifies calculations, e.g. by avoiding integral calculations.

In one or more exemplary fitting agents, applying Monte-Carlo simulation comprises applying Metropolis-Hastings sampling for user response, primary test settings, and secondary test settings, e.g. for D_l, where D_l is trial $(r_l, x_l^{alt}, x_l^{ref})$ for l'th trial, e.g. according to the following model:

$$\phi \sim \mathcal{N}(\mu_{\phi,l-1}, \Sigma_{\phi,l-1})$$

$$r_l\text{-Bernoulli}(\Phi(f(x_l^{alt};\phi) - f(x_l^{ref};\phi))) \qquad (15)$$

The fitting agent is configured to obtain a primary test setting also denoted x_ref or $x^{ref}$ for the hearing device. The primary test setting x-ref is a vector comprising M hearing device parameters for the hearing device. The hearing device parameters may comprise one or more of filter coefficients, compressor settings, gains, or other parameters relevant for the operation of or signal processing in the hearing device.

The fitting agent is configured to obtain a secondary test setting also denoted x_alt or $x^{alt}$ for the hearing device. The secondary test setting x_ref is a vector comprising M hearing device parameters for the hearing device. The hearing device parameters may comprise one or more of filter coefficients, compressor settings, gains, or other parameters relevant for the operation of or signal processing in the hearing device.

In one or more exemplary fitting agents, to obtain the secondary test setting optionally comprises to obtain a candidate set of candidate test settings; determine an uncertainty parameter for each candidate test setting; and select the secondary test setting from the candidate set of candidate test settings, e.g. based on the uncertainty parameters of the candidate test settings.

The fitting agent is configured to present the primary test setting and the secondary test setting to a user. To present the primary test setting and the secondary test setting to a user optionally comprises to output a primary test signal according to the primary test setting. To present the primary test setting and the secondary test setting to a user optionally comprises to generate the primary test signal according to the primary test setting in accessory device and to stream the primary test signal from accessory device to hearing device. To present the primary test setting and the secondary test setting to a user optionally comprises to transmit a control signal indicative of primary test signal/primary test setting from accessory device to hearing device. The control signal may include primary test setting. To present the primary test setting and the secondary test setting to a user may comprise to generate the primary test signal according to the control signal in the hearing device, e.g. based on primary test setting of the control signal.

To present the primary test setting and the secondary test setting to a user optionally comprises to output a secondary test signal according to the secondary test setting. To present the primary test setting and the secondary test setting to a user optionally comprises to generate the secondary test signal according to the secondary test setting in accessory device and to stream the secondary test signal from accessory device to hearing device. To present the primary test setting and the secondary test setting to a user optionally comprises to transmit a control signal indicative of secondary test signal/secondary test setting from accessory device to hearing device. The control signal may include secondary test setting. To present the primary test setting and the secondary test setting to a user may comprise to generate the secondary test signal according to the control signal in the hearing device, e.g. based on secondary test setting of the control signal.

The fitting agent is configured to detect a user input of a preferred test setting indicative of a preference for either the primary test setting or the secondary test setting. In the fitting agent, to detect a user input of a preferred test setting indicative of a preference for either the primary test setting or the secondary test setting may comprise prompting the user for the user input, e.g. by a beep tone signal or voice signal from the hearing device and/or a visual, haptic and/or audio prompt from an accessory device. Detecting a user input may be performed on the hearing device, e.g. by a user activating a button and/or an accelerometer (e.g. single or double tapping the hearing device housing) in the hearing device. To detect a user input may be performed on an accessory device, e.g. by a user selecting a user interface element representative of the preferred test setting, e.g. on a touch-sensitive display of the user accessory device.

For an initial trial, the primary test setting and the secondary test setting may be initialized at random. The initial trial may be followed by a number of trials, where each trial comprises to obtain test settings x_ref, x_alt, output test signals, and detect preferred test setting.

In one or more exemplary methods, obtaining the secondary test setting optionally comprises obtaining a candidate set of candidate test settings; determining an uncertainty parameter for each candidate test setting; and selecting the secondary test setting from the candidate set of candidate test settings based on the uncertainty parameters of the candidate test settings.

In the fitting agent and/or method, to obtain the secondary test setting may comprise to obtain a candidate set of candidate test settings; determine an uncertainty parameter also denoted UP for each candidate test setting; and select the secondary test setting from the candidate set of candidate test settings optionally based on the uncertainty parameters of the candidate test settings.

A candidate set of candidate test settings also denoted CTS_set may comprise a number N_C of candidate test settings, such as a plurality of candidate test settings. A candidate test setting is also denoted CTS. The number N_C of candidate test settings may be at least 3. In one or more exemplary fitting agents/methods, the number N_C of candidate test settings may be at least 5 or even larger than 20. In other words, the candidate set of candidate test settings comprises candidate test settings CTS_i, i=1, 2, . . . , N_C, where i is an index for candidate test settings of the candidate set. The number N_C of candidate test settings may depend on the number M of hearing device parameters, e.g. N_C may be larger than 3M, larger than 4M; or larger than 5M. A candidate test setting CTS_i is a vector comprising M hearing device parameters for the hearing device. The hearing device parameters of candidate test setting CTS_i may comprise one or more of filter coefficients, compressor settings, gains, or other parameters relevant for the operation of or signal processing in the hearing device.

In one or more exemplary fitting agents/methods, to determine an uncertainty parameter for each candidate test setting may comprise to determine mutual information I between the primary test setting and the respective candidate test setting. In other words, UP_i may be determined for CTS_i for i=1, 2, . . . , N_C and given by UP_i=I(x_ref, CTS_i).

The uncertainty parameters UP_i may be given as:

$$UP_i = I(x^{ref}, CTS_i) = I(R; \theta, \Lambda | R_1^{n-1}, \{x_{ref}, x^{alt}\}_1^{n-1}, \{x^{ref}, CTS_i\}) \quad (16)$$

where $x^{ref}$ is the primary test setting for the current trial, $R_1^{n-1}$ are the user responses to the previous trials T_1 to T_n−1.

In one or more exemplary fitting agents/methods, to determine an uncertainty parameter for each candidate test setting comprises to apply a predictor for one or more, such as each candidate test setting. In other words, a predictor may be applied to each of the candidate test settings CTS_i, i=1, 2, . . . , N_C. The predictor also denoted P_U or $P^u$ may be a user response distribution. The predictor may be based on a posterior updated based on previous user responses and trials.

In one or more exemplary fitting agents/methods, the predictor is a weighted distribution function.

For example, the predictor $P^u$ may be given by:

$$P^u = \int\int w(\theta, \Lambda) \cdot P(r_n | \theta, \Lambda, r_1^{n-1}, \{x^{ref}, x^{alt}\}_1^{n-1}, \{x_n^{ref}, x_n^{alt}\}) \, d\theta d\Lambda, \quad (17)$$

where w is a weighting function/distribution and $r_n$ is a user response.

For example, the predictor $P^u$ may be a weighted distribution, where the weighting function is a posterior distribution, e.g. of one or more of both of θ,Λ. Thus the predictor $P^u$ may be given by:

$$P^u = \int\int p(\theta, \Lambda | r_1^{n-1}, \{x^{ref}, x^{alt}\}_1^{n-1}) \cdot P(r_n | \theta, \Lambda r_1^{n-1}, \{x^{ref}, x^{alt}\}_1^{n-1}, \{x_n^{ref}, x_n^{alt}\}) d\theta d\Lambda, \quad (18)$$

In one or more exemplary fitting agents/methods, to select the secondary test setting from the candidate set of candidate test settings comprises to select the candidate test setting having the largest uncertainty parameter as the secondary test setting. In other words, the secondary test setting may be selected as the candidate test setting in the candidate set where the model has the highest uncertainty or where the user model is least precise, in turn leading to a fast hearing device parameter optimization and/or learning for the user model with few user interactions.

In one or more exemplary fitting agents/methods, to obtain a candidate set of candidate test settings comprises to obtain a first candidate test setting by sampling a posterior (distribution), such as a posterior of hearing device parameters of the user preference function. To obtain a candidate set of candidate test settings may comprise to obtain the candidate test settings of the candidate set by sampling a posterior, such as a posterior (distribution) of hearing device parameters of the user preference function.

To obtain a candidate set of candidate test settings may comprise generating one or more candidate test settings based on a posterior. The posterior may be a marginal posterior distribution of optimal hearing device parameters.

In one or more exemplary fitting agents, to obtain a candidate set of the candidate test settings may comprise sampling from an exact posterior distribution, from a sample posterior distribution, e.g. based on Monte-Carlo simulations, or approximate posterior distribution.

To obtain a candidate set of candidate test settings may comprise generating candidate test settings according to:

$$CTS_i \sim \int p(\theta, \Lambda | r_1^{n-1}, \{x^{ref}, x^{alt}\}_1^{n-1}) d\Lambda \text{ for } i=1,2,\ldots,N_C, \quad (19)$$

In other words, the candidate test settings may be generated according to the marginal posterior distribution of optimal hearing device parameters.

In one or more exemplary fitting agents/methods, the fitting agent is configured to determine whether a stopping criterion is satisfied; and in accordance with a determination that the stopping criterion is satisfied, updating the hearing device parameters of the hearing device based on the updated user model. The stopping criterion evaluates whether the user model is sufficiently precise to provide useful hearing device parameters. In other words, the stopping criterion may be satisfied when it is determined that the user model provides a sufficiently high degree of certainty of the user's preference.

Updating the hearing device parameters of the hearing device based on the updated user model may comprise obtaining user preference for primary or secondary test settings and updating the posterior distribution based on the observed user response and test settings. The hearing device parameters may be then determined using maximum a posteriori estimation or alternatively as posterior mean or median. In other words, updating the hearing device parameters of the hearing device may comprise determining the hearing device parameters by applying one of maximum a posteriori estimation, posterior mean estimation, and posterior median estimation.

In one or more exemplary fitting agents/methods, the fitting agent is configured to updating the hearing device parameters of the hearing device after each update of the user model.

To update the hearing device parameters may comprise to determine updated hearing device parameters based on a maximum a posteriori estimation, a mean, or a median of a posterior of the user preference function.

In one or more exemplary fitting agents/methods, updating the hearing device parameters of the hearing device comprises transmitting the updated hearing device parameters to hearing device from accessory device.

In one or more exemplary fitting agents/methods, the stopping criterion is based on a divergence, such as normalized and/or weighted information divergence. The stopping criterion may be based on a Kullback-Leibler (KL) divergence.

In one or more exemplary fitting agents/methods, the KL divergence is given as:

$$D_n(Q, w, \{x^{ref}, x^{alt}\}) \triangleq \frac{1}{n} \int_\Omega w(\phi) \mathbb{D}_n(P\|Q) d\phi, \quad (20)$$

where w is a weighting distribution on ϕ. D_n is normalized weighted KL-divergence and $\mathbb{D}$ is the KL-divergence given by:

$$\mathbb{D}_n(P\|Q) \triangleq \mathbb{E}[-\log Q(R_1^n | \{x^{ref}, x^{alt}\}_1^n) - \quad (21)$$
$$(-\log P(R_1^n | \phi, \{x^{ref}, x^{alt}\}_1^n))]$$
$$= \mathbb{D}(P(R_1^n | \phi, \{x^{ref}, x^{alt}\}_1^n) \vee Q(R_1^n | \{x^{ref}, x^{alt}\}_1^n)),$$

where P is a true user response distribution, Q is fitting agent-assigned user distribution (may be P_U), and n is a number of performed trials.

The stopping criterion may be based on a divergence parameter, e.g. the KL divergence as given above. The divergence parameter may be indicative of an absolute divergence and/or a change, such as a difference ($D_{n-1}-D_n$) or ratio ($D_n/D_{n-1}$), in divergence for the previous user model and for the updated user model. In other words, to determine whether a stopping criterion is satisfied may comprise to determine a divergence parameter, and optionally determine if the divergence parameter satisfies the stopping criterion, e.g. if the divergence parameter is less than a threshold or if the divergence parameter is larger than a threshold. Thus, the stopping criterion may be based on one or more thresholds.

In one or more exemplary fitting agents/methods, the stopping criterion is based on the number of trials performed. For example, the stopping criterion may be satisfied when the fitting agent has performed 10 trials.

In one or more exemplary fitting agents/methods, the fitting agent is configured to update the predictor based on hearing device parameters of the preferred test setting. In other words, to update the model may comprise to update the user response model based on the primary test setting, the secondary test setting, and the preferred test setting of the primary test setting and the secondary test setting.

It is noted that descriptions and features of fitting agent functionality also applies to methods and vice versa.

Figure 1:
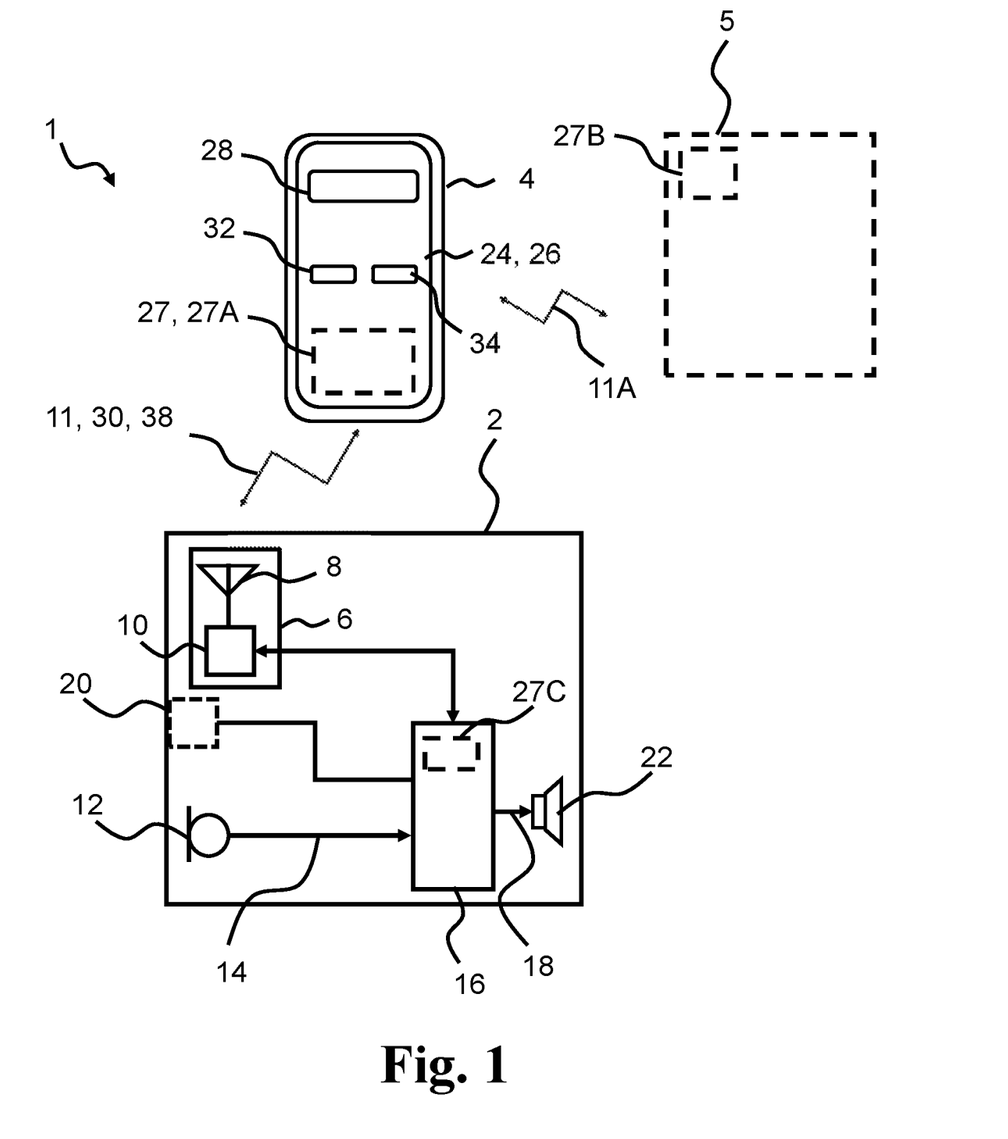
FIG. 1 schematically illustrates a hearing system according to the present disclosure.

FIG. 1 is an overview of a hearing system with a fitting agent according to the present disclosure. The hearing system comprises a hearing device 2, an accessory device 4, and optionally a server device/fitting device 5. The hearing device 2 comprises a transceiver module 6 for (wireless) communication with the accessory device 4 and optionally a contralateral hearing device (not shown in FIG. 1). The transceiver module 6 comprises antenna 8 and transceiver 10, and is configured for receipt and/or transmission of wireless signals via wireless connection 11 to the accessory device 4. The hearing device 2 comprises a set of one or a plurality of microphones comprising a first microphone 12 for provision of a first microphone input signal 14; a processor 16 for processing input signals including the first microphone input signal 14 according to one or more hearing device parameters and providing an electrical output signal 18 based on input signals; an optional user interface 20 connected to the processor 16; and a receiver 22 for converting the electrical output signal 18 to an audio output signal.

The accessory device 4 is a smartphone and comprises a user interface 24 comprising a touch display 26, a processor (not shown), and a memory (not shown).

In the hearing system 1, the fitting agent 27 is an application installed in the memory of the accessory device 4.

The fitting agent 27 is a fitting agent for update of a user model for a hearing device user and/or one or more of optimizing, determining, fitting, tuning, and modelling hearing device parameters of a hearing device. The fitting agent 27 is configured to initialize a user model comprising a user preference function $f(x; \theta, \Lambda)$; obtain a primary test setting x_ref for the hearing device; obtain a secondary test setting x_alt for the hearing device; present the primary test setting x_ref and the secondary test setting x_alt to a user e.g. via wireless connection 11; detect a user input R of a preferred test setting indicative of a preference for either the primary test setting x_ref or the secondary test setting x_alt; and update the user model, such as the user preference function $f(x; \theta, \Lambda)$ and/or a user response model (user response distribution) based on hearing device parameters of the preferred test setting, e.g. based on one or more, such as all of r, x_ref, and x_alt.

The fitting agent 27 implemented in the accessory device 4 is configured to update the user model based on the primary test setting, the secondary test setting, and the preferred test setting. In other words, the fitting agent is configured to update the user model based on hearing device parameters of the preferred test setting. To update the user model may comprise updating the user preference model and the user response model based on the primary test setting, the secondary test setting, and the preferred test setting. The fitting agent 27/accessory device 4 may be configured to transmit the primary test setting, the secondary test setting, and the preferred test setting to server device 5 that updates the user model transmits the updated user model to the fitting agent 27/accessory device 4. Thus, fitting agent 27/accessory device 4 may be configured to receive the updated model from the server device 5. In other words, the fitting agent 27 may be distributed on accessory device 4 and one or more of hearing device 2 and server device 5. Thus, the fitting agent 27 may comprise a first part 27A implemented in accessory device 4, optional second part 27B implemented in server device, and optional third part 27C implemented in hearing device 2, such as in processor 16.

In the fitting agent 27, to update the user model comprises to determine a posterior of parameters of the user preference function, e.g. based on a previous parameter posterior, such as the last or current parameter posterior, the preferred test setting, and a non-preferred test setting. To determine a posterior of parameters of the user preference function may comprise to determine or update a being the maximizing argument of $f$ and/or to determine or update A indicative of or characterizing user sensitivity to hearing device parameter changes. To determine the parameter posterior optionally comprises to apply sequential estimation in the fitting agent 27. Thus, the fitting agent 27 is optionally configured to determine the parameter posterior based on only the previous user model and (r, x_ref, x_alt).

In fitting agent 27, to determine the parameter posterior may comprise to determine a first posterior based on a parameter prior having a Gaussian distribution and a likelihood of the user response indicative of preferred test setting. In other words, the first posterior may be based on a parameter prior and the user response distribution. The parameter prior may be an initial prior or the previous posterior and is optionally given by equation (10). In other words, to determine the parameter posterior may comprise to determine the parameter posterior based on only the previous posterior and the latest trial result. Thus, the posterior p_n may be based on the previous posterior p_n−1 and T_n.

The first posterior may be an exact posterior and the second posterior (and therefore the parameter posterior) may be based on the first posterior.

In fitting agent 27, to determine the first posterior optionally comprises to determine the likelihood of the user response by applying the user response distribution and update the parameter prior with likelihood of the user response and optionally perform a normalization for provision of the first posterior. To determine the parameter posterior may comprise to determine a second posterior, such as an approximate posterior, based on the first posterior and/or a minimization of a divergence, such as the KL-divergence, between the first posterior and a Gaussian distribution. In other words, to update the user model based on hearing device parameters of the preferred test setting may comprise to determine, after trial T_1, the exact posterior, e.g. given as equation (11), and determine a distribution $q_i(\bullet)$ (second posterior) that minimizes the KL-divergence, e.g. given as equation (12) assuming that $q_i(\bullet)$ belongs to the family of Gaussian distributions.

In fitting agent 27, to determine the parameter posterior may comprise setting the second posterior as the posterior of the parameters of the user preference function. Setting the second posterior as the posterior of the parameters of the user preference function may comprise storing the second posterior in memory of one or more or accessory device, server device, and hearing device.

In fitting agent 27, to determine the second posterior optionally comprises determining the first moment, and wherein the second posterior is based on the first moment. The first moment may be denoted $\mu_{\phi,1}$ and given by equation (13). To determine the first moment may comprise applying Monte-Carlo simulation, e.g. including to apply Metropolis-Hastings sampling for user response, and primary and secondary test settings, optionally in combination with maximum likelihood estimation.

In fitting agent 27, to determine the second posterior optionally comprises determining the second moment, and wherein the second posterior is based on the second moment. The second moment may be denoted $\Sigma_{\phi,1}$ and given by equation (14).

To determine the second moment may comprise applying Monte-Carlo simulation, e.g. including to apply Metropolis-Hastings sampling for user response, and primary and secondary test settings, optionally in combination with maximum likelihood estimation.

In the fitting agent 27, to obtain the secondary test setting optionally comprises to obtain a candidate set CTS_set of candidate test settings CTS_i, i=1, 2, . . . , N_C, where N_C is the number of candidate test settings in CTS_set; optionally determine an uncertainty parameter UP_i and/or a certainty parameter CP_i for each candidate test setting CTS_i, i=1, 2, . . . , N_C; and optionally select the secondary test setting x_alt from the candidate set of candidate test settings based on the uncertainty parameters UP_i and/or the certainty parameters CP_i, i=1, 2, . . . , N_C of the candidate test settings. In fitting agent 27, to determine uncertainty parameters UP_i, i=1, 2, . . . , N_C may comprise to apply a predictor or posterior being a weighted weighted distribution function for each candidate test setting.

The fitting agent 27 is optionally configured to select the secondary test setting from the candidate set of candidate test settings by selecting the candidate test setting where the user preference model has the least knowledge of the user's preference. In other words, the fitting agent 27 is optionally configured to select the secondary test setting from the candidate set of candidate test settings by selecting the candidate test setting having the largest uncertainty parameter as the secondary test setting. In one or more exemplary fitting agents, the fitting agent is configured to determine a certainty parameter for each candidate test setting and selecting the candidate test setting having the smallest certainty parameter as the secondary test setting.

The fitting agent 27 is optionally configured to obtain a candidate set of candidate test settings, such as one or more candidate test settings, e.g. including a first candidate test setting, by sampling a distribution, such as a posterior distribution. Thus, in fitting agent 27, to obtain a candidate set of candidate test settings optionally comprises to obtain a first candidate test setting and/or a plurality of first candidate test settings, e.g. at least 3 candidate test settings, by sampling a posterior distribution of the optimal parameters for the hearing device.

The fitting agent 27 is optionally configured to determine whether a stopping criterion is satisfied; and in accordance with a determination that the stopping criterion is satisfied, updating the hearing device parameters of the hearing device based on the updated user model, e.g. by transmitting the updated hearing device parameters to the hearing device via wireless connection 11. The stopping criterion is optionally based on a divergence, such as a normalized weighted information divergence, such as a Kullback-Leibler (KL) divergence. For example, the stopping criterion may be satisfied when the divergence is less than a threshold or when a difference in divergence between the divergence of the current trial and the previous trial is less than a threshold or when a rate between the divergence of the current trial and the previous trial is less than a threshold. In other words, the fitting agent 27 is optionally configured to perform trials (determine and present test settings, detect user response, and update user model), if the divergence is larger than a threshold. In one or more exemplary fitting agents, the stopping criterion may be satisfied when a user provides a user input indicative of a desire to stop optimization, e.g., by detecting a user selection of a stop virtual button (not shown) on the user interface 26 of accessory device 4 and/or when a pre-set number of user inputs of preferred test setting(s).

The fitting agent 27 is optionally configured to update the predictor based on hearing device parameters of the preferred test setting. To update the predictor may comprise to update weighting function and/or the user response distribution.

The fitting agent 27 may be configured to perform user model update or hearing device parameter optimization in accordance a determination that a start criterion is satisfied. The start criterion may be satisfied if a user input on user interface 20 or user interface 24 indicative of a user desire to start hearing device parameter optimization has been detected, e.g. by activation of virtual start button 28 on the accessory device 4. In one or more exemplary fitting agents, such as fitting agent 27, the start criterion is based on a time since last user model update. For example, the fitting agent 27 may be configured to perform hearing device parameter optimization at least every 3 months. The start criterion may be based on a combination of user input and time since last model update.

In an implementation including accessory device 4, the fitting agent 27/accessory device 4 may be configured to send a control signal 30 to the hearing device 2, the control signal 30 being indicative of the primary test setting and the secondary test setting, thus enabling the hearing device 2 to output test signals accordingly.

The hearing device 2 (processor 16) is optionally configured to output a primary test signal according to the primary test setting via the receiver 22 and a secondary test signal according to the secondary test setting via the receiver 22.

The fitting agent 27 (hearing device 2 (processor 16) and/or the accessory device 4) is configured to detect a user input of a preferred test setting indicative of a preference for either the primary test setting or the secondary test setting, e.g. by detecting a user input on user interface 20 or by detecting a user selection of one of a primary virtual button 32 (primary test setting is preferred) and a secondary virtual button 34 (secondary test setting is preferred) on the user interface 24 of accessory device 4.

It is to be noted that the fitting agent 27 may be configured to detect a user input of a preferred test setting indicative of a preference for either the primary test setting or the secondary test setting, e.g. by receiving a wireless input signal from a secondary accessory device, such as smartwatch comprising a user interface. Thereby, a more convenient user input is provided for, which in turn increases the user friendliness of the fitting agent.

In an implementation including accessory device 4, the accessory device 4 may be configured to send a control signal 32 to the hearing device 2, e.g. in accordance with a determination that a stopping criterion is satisfied, the control signal 38 being indicative of the hearing device parameters of the preferred test setting, thus enabling the hearing device to update and apply preferred hearing device parameters in the hearing device.

Figure 2:
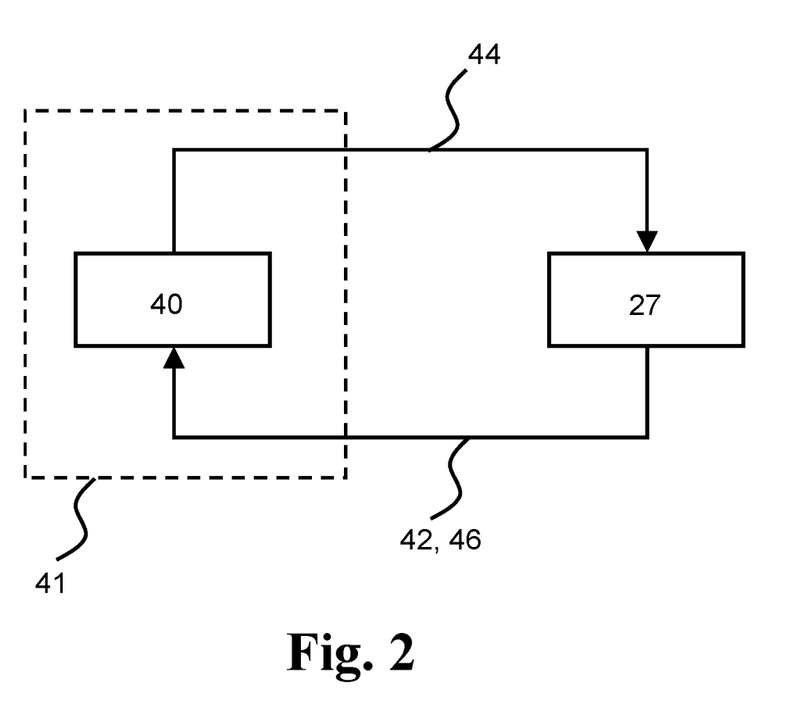
FIG. 2 illustrates interaction between a user and a fitting agent.

FIG. 2 illustrates interaction between a user 40 in an environment 41 and a fitting agent 27. For each interaction or trial indexed with index n, the fitting agent generates a primary test setting $x_n^{ref}$ and a secondary test setting $x_n^{alt}$ and presents 42 the test settings $x_n^{ref}$ and $x_n^{alt}$ for the user, e.g. by controlling hearing device for outputting primary test signal and secondary test signal respectively according to and indicative of the primary test setting and the secondary test setting. The user evaluates the two test settings $x_n^{ref}$ and $x_n^{alt}$, and the fitting agent 27 receives and detects the user's response 44, $r_n$ indicative of the preferred test setting of the primary test setting and the secondary test setting. The fitting agent updates the user model based on $r_n$, $x_n^{ref}$, and $x_n^{alt}$, and generates n+1'th trial $\{x_{n+1}^{ref}; x_{n+1}^{alt}\}$, by setting the preferred test setting of the n'th trial as the primary test setting $x_{n+1}^{ref}$ of the n+1'th trial, determines secondary test setting $x_{n+1}^{alt}$ as described herein and presents 46 the test settings $x_{n+1}^{ref}$ and $x_{n+1}^{alt}$ for the user.

Figure 3A:
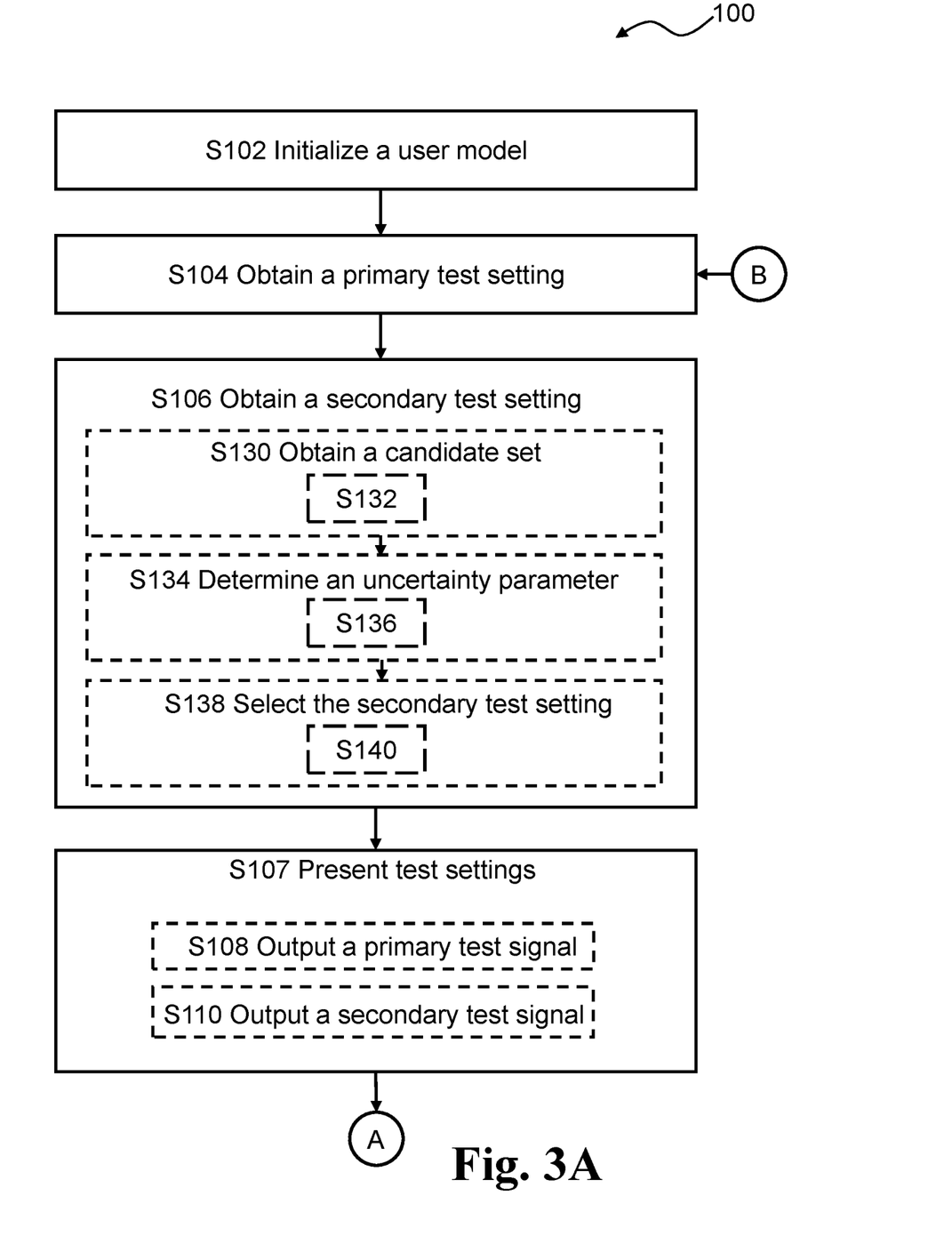
FIGS. 3A-3B is a flow diagram of an exemplary method according to the present disclosure.
Figure 3B:
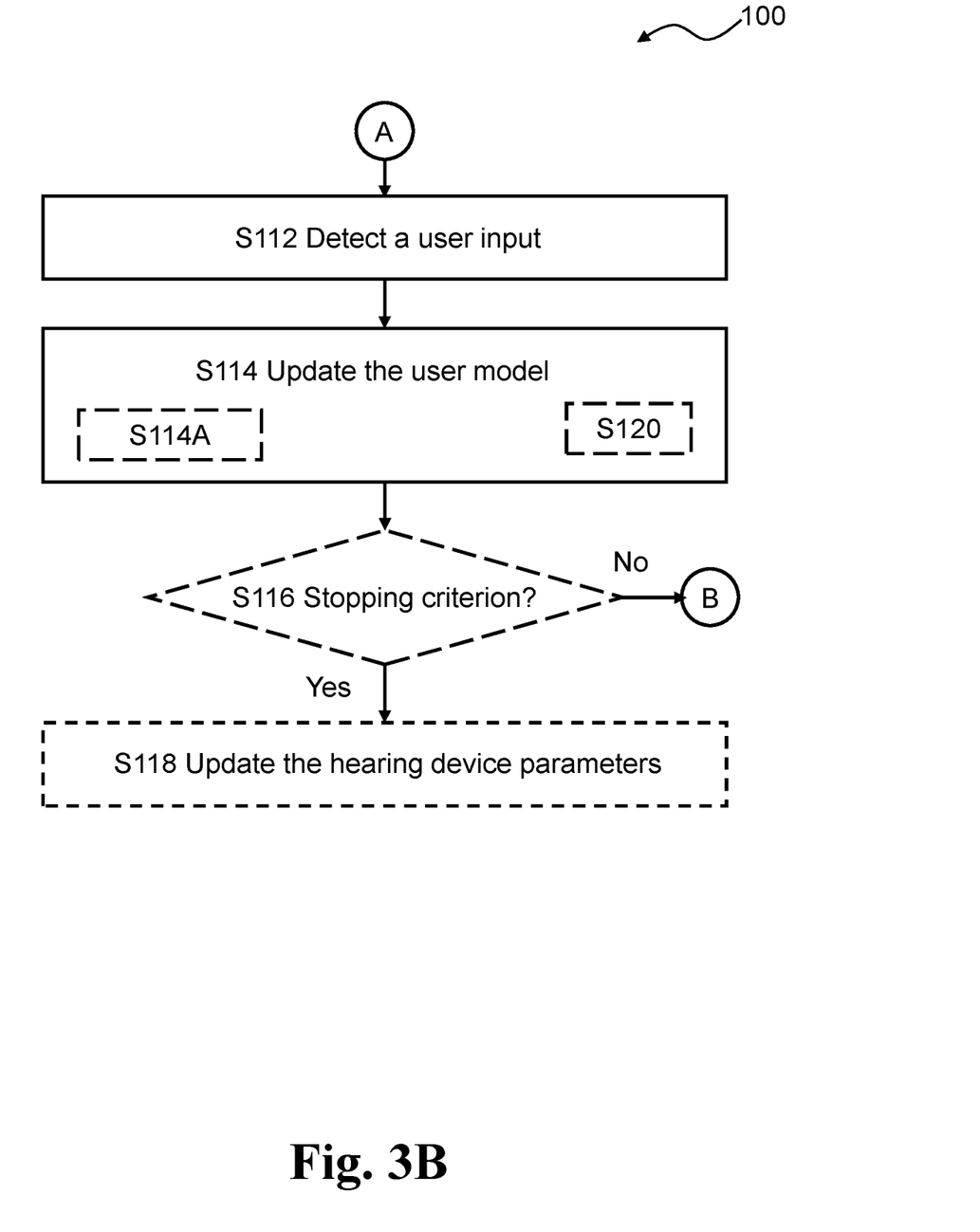

FIGS. 3A-3B is a flow diagram of an exemplary method according to the present disclosure. The method 100 is a method of updating a user model for a hearing device user and/or for one or more of optimizing, determining, fitting, tuning, and modelling, such as determining hearing device parameters of a hearing device, wherein the method comprises initializing S102 a user model, the user model optionally comprising a user preference function and a user response model; obtaining S104 a primary test setting for the hearing device, e.g. with a fitting agent implemented in one or more of a hearing device 2, an accessory device 4, and a server device 5; obtaining S106 a secondary test setting for the hearing device; presenting S107 the primary test setting and the secondary test setting to a user; detecting S112 a user input of a preferred test setting indicative of a preference for either the primary test setting or the secondary test setting; and updating S114 the user model based on hearing device parameters of the preferred test setting. Updating S114 the user model optionally comprises updating S120 predictor/user response model of the user model.

In the method 100, updating 114 the user model may comprise determining 114A a posterior of the parameters of the user preference function based on a previous or latest parameter posterior, the preferred test setting, and the non-preferred test setting, e.g., as described above with reference to the fitting agent.

The method 100 optionally comprises determining S116 whether a stopping criterion is satisfied and updating S118 hearing device parameters of hearing device in accordance with the updated model, e.g. as described above in relation to the fitting agent. The method 100 optionally proceeds to S104 if it is determined that the user model has not been sufficiently updated (stopping criterion is not satisfied), i.e. further trials and user input on test settings is desired or required for an accurate and precise modelling of the user preference function.

In the method 100, obtaining S104 the secondary test setting may comprise obtaining S130 a candidate set of candidate test settings, e.g. a candidate set of at least 5 or at least 20, such as at least $\alpha N\_C$, candidate test settings, $N\_C$ being the number of hearing device parameters to be optimized and a optionally being larger than 3; optionally determining S134 an uncertainty parameter and/or a certainty parameter for each candidate test setting; and optionally selecting S138 the secondary test setting from the candidate set of candidate test settings based on the uncertainty parameters and/or the certainty parameters of the candidate test settings.

Determining S134 an uncertainty parameter and/or certainty parameter may comprise applying S136 a predictor for each candidate test setting and/or selecting S138 the secondary test setting from the candidate set of candidate test settings may comprise selecting S140 the candidate test setting with the largest uncertainty parameter or with the smallest certainty parameter as the secondary test setting.

In the method 100, presenting S107 the primary test setting and the secondary test setting to a user optionally comprises outputting S108 a primary test signal according to the primary test setting and/or outputting S110 a secondary test signal according to the secondary test setting.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information in a part of the memory.

Furthermore, the labelling of a first element does not imply the presence of a second element and vice versa.

It may be appreciated that FIGS. 1-3B comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1 hearing device system
2 hearing device
4 accessory device
5 server device
6 transceiver module
8 antenna
10 transceiver
11 wireless connection between hearing device and accessory device
11A wireless connection between accessory device and server device
12 first microphone
14 first microphone input signal
16 processor
18 electrical output signal
20 user interface
22 receiver
24 user interface of accessory device
26 touch display
27 fitting agent
27A first part of fitting agent
27B second part of fitting agent
27C third part of fitting agent
28 start button
30 control signal indicative of primary and secondary test setting
32 primary virtual button
34 secondary virtual button
38 control signal indicative of the hearing device parameters of the preferred test setting
40 user
42 n'th trial, test settings $x_n^{ref}$ and $x_n^{alt}$
44 user response to n'th trial
46 n+1'th trial, test settings $x_{n+1}^{ref}$ and $x_{n+1}^{alt}$
100 Method of updating a user model for a hearing device user and/or for determining hearing device parameters of a hearing device
S102 initialize a user model
S104 obtaining a primary test setting
S106 obtaining a secondary test setting
S107 presenting the primary test setting and the secondary test setting to a user
S108 outputting a primary test signal
S110 outputting a secondary test signal
S112 detecting a user input
S114 updating the user model
S114A determining a posterior of parameters of the user preference function based on a previous parameter posterior, the preferred test setting, and a non-preferred test setting
S116 determining whether stopping criterion is satisfied
S118 updating the hearing device parameters
S120 updating the predictor
S130 obtaining a candidate set
S132 obtaining a first candidate test setting
S134 determining an uncertainty parameter
S136 applying a predictor for each candidate test setting
S138 selecting the secondary test setting
S140 selecting the candidate test setting with largest uncertainty parameter

The invention claimed is:

1. An apparatus comprising:
an output interface configured to provide a primary test setting and a secondary test setting for presentation to a user;
an input interface configured to obtain a user input indicative of a preference for either the primary test setting or the secondary test setting as a preferred test setting; and a processing unit configured to update a user model based on a hearing device parameter associated with the preferred test setting, the user model comprising a user preference function and user response distribution;

wherein the processing unit is configured to update the user model by determining a parameter posterior associated with the user preference function based on a previous parameter posterior, the preferred test setting, and a non-preferred test setting.

2. The apparatus according to claim 1, wherein the processing unit is configured to determine the parameter posterior by applying a sequential estimation.

3. The apparatus according to claim 1, wherein the processing unit is configured to determine the parameter posterior by determining a first posterior based on a parameter prior having a Gaussian distribution and a likelihood of a user response indicative of the preferred test setting, and wherein the parameter posterior is based on the first posterior.

4. The apparatus according to claim 3, wherein the processing unit is configured to determine the first posterior by:
    determining the likelihood of the user response by applying the user response distribution,
    updating the parameter prior with the likelihood of the user response, and
    performing a normalization for provision of the first posterior.

5. The apparatus according to claim 1, wherein the processing unit is configured to determine the parameter posterior by determining a first posterior, and determining a second posterior based on the first posterior and a minimization of a divergence between the first posterior and a Gaussian distribution.

6. The apparatus according to claim 5, wherein the processing unit is configured to determine the parameter posterior by setting a second posterior as the parameter posterior.

7. The apparatus according to claim 5, wherein the processing unit is configured to determine the second posterior by determining a first moment, and wherein the second posterior is based on the first moment.

8. The apparatus according to claim 5, wherein the processing unit is configured to determine a first moment, and wherein the processing unit is configured to determine the second posterior by determining a second moment, and wherein the second posterior is based on the second moment.

9. The apparatus according to claim 8, wherein the processing unit is configured to determine the first moment and the second moment by applying Monte-Carlo simulation in combination with maximum likelihood estimation.

10. The apparatus according to claim 9, wherein the processing unit is configured to apply the Monte-Carlo simulation by applying Metropolis-Hastings sampling for D_I, where D_I is a trial.

11. The apparatus of claim 1, wherein the previous parameter posterior is different from trial results.

12. The apparatus of claim 1, wherein the previous parameter posterior is different from test settings.

13. A method comprising
    obtaining a user model comprising a user preference function and a user response distribution;
    obtaining a primary test setting;
    obtaining a secondary test setting,
    outputting a primary test signal according to the primary test setting;
    outputting a secondary test signal according to the secondary test setting;
    obtaining a user input indicative of a preference for either the primary test setting or the secondary test setting as a preferred test setting; and
    updating the user model based on a hearing device parameter associated with the preferred test setting;
    wherein the act of updating the user model comprises determining a parameter posterior associated with the user preference function based on a previous parameter posterior, the preferred test setting, and a non-preferred test setting.

14. A fitting agent configured to perform the method of claim 13.

15. The method of claim 13, wherein the previous parameter posterior is different from trial results.

16. The method of claim 13, wherein the previous parameter posterior is different from test settings.

* * * * *